United States Patent
Saint-Jalmes et al.

(10) Patent No.: US 7,484,795 B2
(45) Date of Patent: Feb. 3, 2009

(54) PROCESS FOR MODULING THE INTERIOR SPACE OF A VEHICLE AND A SEAT FOR PERFORMING THIS PROCESS

(75) Inventors: Bruno Saint-Jalmes, Toulouse (FR); Jazon Zaneboni, Toulouse (FR); Andre Rezag, Toulouse (FR)

(73) Assignee: Airbus, Blagnac (FR)

( * ) Notice: Subject to any disclaimer, the term of this patent is extended or adjusted under 35 U.S.C. 154(b) by 0 days.

(21) Appl. No.: 10/485,735

(22) PCT Filed: Dec. 16, 2003

(86) PCT No.: PCT/FR03/03737

§ 371 (c)(1),
(2), (4) Date: Aug. 10, 2006

(87) PCT Pub. No.: WO2005/065990

PCT Pub. Date: Jul. 21, 2005

(65) Prior Publication Data

US 2007/0126270 A1    Jun. 7, 2007

(30) Foreign Application Priority Data

Dec. 10, 2003   (FR)   ................................. 03 14450

(51) Int. Cl.
*B60N 2/02*   (2006.01)
*B60N 2/24*   (2006.01)

(52) U.S. Cl. .......................... 297/94; 297/95; 297/130; 297/283.3; 297/383

(58) Field of Classification Search .................. 297/94, 297/95, 112, 118, 130, 283.3, 353, 383
See application file for complete search history.

(56) References Cited

U.S. PATENT DOCUMENTS 9,583 A * 2/1853 Briggs .......................... 297/95

(Continued)

FOREIGN PATENT DOCUMENTS

CH         287 456         11/1952

(Continued)

OTHER PUBLICATIONS

U.S. Appl. No. 10/441,399, filed May 20, 2003, Saint Jalmes.

(Continued)

*Primary Examiner*—Rodney B. White
(74) *Attorney, Agent, or Firm*—Oblon, Spivak, McClelland, Maier & Neustadt, P.C.

(57) ABSTRACT

A seat for a vehicle includes a sitting portion, a movable back; and a first guide mechanism configured to move the back from a first edge of the sitting portion to an opposite second edge of the sitting portion. The back is assembled on the sitting portion by a movable element including a base configured to move between the first edge of the sitting portion and the opposite second edge, and a support assembled pivoting on the movable base. The movable base is in a form of a stirrup, a base of the stirrup extending from a first lateral edge to a second latent edge of the sitting portion. Each branch of the stirrup extends substantially parallel to the first lateral edge and is curved at a free end under the sitting portion.

9 Claims, 5 Drawing Sheets

U.S. PATENT DOCUMENTS

| | | | | |
|---|---|---|---|---|
| 18,252 | A * | 9/1857 | Swan | 297/95 |
| 82,527 | A * | 9/1868 | Joeckel | 297/95 |
| 117,599 | A * | 8/1871 | Buck et al. | 297/94 |
| 121,145 | A * | 11/1871 | Allen | 297/95 |
| 152,169 | A * | 6/1874 | Richardson | 297/94 X |
| 180,582 | A * | 8/1876 | Heywood | 297/94 |
| 324,825 | A * | 8/1885 | Forney | 297/95 |
| 334,957 | A * | 1/1886 | Lemman | 297/95 |
| 344,113 | A * | 6/1886 | Kafer | 297/95 |
| 364,011 | A * | 5/1887 | Hale | 297/95 |
| 365,311 | A * | 6/1887 | Lemman | 297/95 |
| 367,394 | A * | 8/1887 | Henry | 297/95 |
| 377,205 | A * | 1/1888 | Luce | 297/95 |
| 387,404 | A * | 8/1888 | Doyle | 297/94 |
| 417,823 | A * | 12/1889 | Hale | 297/95 |
| 430,413 | A * | 6/1890 | Applin | 297/95 |
| 432,702 | A * | 7/1890 | Hale | 297/95 |
| 432,703 | A * | 7/1890 | Hale | 297/95 |
| 443,308 | A * | 12/1890 | Wright | 297/94 |
| 444,132 | A * | 1/1891 | Mitchell | 297/94 |
| 448,424 | A * | 3/1891 | Gilfillan | 297/94 |
| 462,723 | A * | 11/1891 | Morss | 297/94 X |
| 491,761 | A * | 2/1893 | Aze et al. | 297/95 |
| 505,246 | A * | 9/1893 | Hale | 297/95 |
| 512,539 | A * | 1/1894 | Cushing | 297/95 |
| 521,121 | A * | 6/1894 | Little | 297/95 |
| 527,842 | A * | 10/1894 | Forney | 297/95 |
| 596,434 | A * | 12/1897 | Johnston | 297/95 X |
| 625,885 | A * | 5/1899 | Johnston | 297/94 X |
| 629,258 | A * | 7/1899 | Johnston | 297/94 |
| 639,923 | A * | 12/1899 | Johnston | 297/95 X |
| 644,437 | A * | 2/1900 | Meier | 297/95 X |
| 655,771 | A * | 8/1900 | Forney | 297/95 X |
| 676,500 | A * | 6/1901 | Hunter | 297/95 X |
| 676,501 | A * | 6/1901 | Hunter | 297/95 X |
| 714,979 | A * | 12/1902 | Weber | 297/95 |
| 716,882 | A * | 12/1902 | Forney | 297/95 |
| 831,777 | A * | 9/1906 | Dryer | 297/95 |
| 831,877 | A * | 9/1906 | Kling | 297/94 |
| 923,197 | A * | 6/1909 | Murchison | 297/94 |
| 1,142,203 | A * | 6/1915 | Rader | 297/95 |
| 1,219,686 | A * | 3/1917 | Reisinger | 297/94 X |
| 1,337,295 | A * | 4/1920 | Turner | 297/94 |
| 1,423,508 | A * | 7/1922 | Andrusyszyn | 297/94 |
| 1,443,479 | A * | 1/1923 | Lambert | 297/94 |
| 1,695,101 | A | 12/1928 | Hoffman | |
| 2,007,471 | A * | 7/1935 | Landgrebe | 297/94 |
| 2,059,397 | A * | 11/1936 | Robinson, Sr. | 297/95 X |
| 2,514,798 | A * | 7/1950 | Rowe | 297/95 |
| 2,642,922 | A | 6/1953 | Monroe | |
| 2,875,811 | A * | 3/1959 | Fall | 297/95 |
| 3,743,350 | A * | 7/1973 | Allen | 297/94 |
| 3,877,746 | A * | 4/1975 | Christine et al. | 297/95 |
| 4,081,051 | A | 3/1978 | Logsdon | |
| 4,322,052 | A * | 3/1982 | Hodge et al. | 248/420 |
| 4,893,578 | A * | 1/1990 | Doerfer et al. | 297/94 X |
| 5,076,640 | A * | 12/1991 | Bulte | 297/94 X |
| 5,320,059 | A * | 6/1994 | Ikeda | 297/94 X |
| 5,322,341 | A * | 6/1994 | Harrison et al. | 297/94 |
| 5,362,124 | A * | 11/1994 | Schlidt | 297/95 |
| 6,053,569 | A | 4/2000 | Flyborg | |
| 6,199,945 | B1 * | 3/2001 | Kim | 297/94 |
| 6,488,333 | B2 * | 12/2002 | Kim | 297/94 |
| 6,494,531 | B1 * | 12/2002 | Kim | 297/94 |
| 6,715,825 | B2 * | 4/2004 | Tame | 297/94 |
| 6,719,366 | B2 * | 4/2004 | Lane | 297/95 |
| 7,125,076 | B2 * | 10/2006 | Beranek et al. | 297/283.3 |
| 7,281,761 | B2 * | 10/2007 | Brown et al. | 297/95 |
| 2003/0218095 | A1 | 11/2003 | Jalmes | |
| 2003/0226934 | A1 | 12/2003 | Saint-Jalmes | |
| 2005/0253433 | A1 * | 11/2005 | Brown et al. | 297/283.3 |

FOREIGN PATENT DOCUMENTS

| | | | |
|---|---|---|---|
| FR | 2 671 530 | 7/1992 | |
| GB | 468 110 | 6/1937 | |
| JP | 59018028 A * | 1/1984 | 297/94 |
| SU | 1 397 326 A1 | 5/1988 | |
| WO | 2004/018290 | 3/2004 | |

OTHER PUBLICATIONS

U.S. Appl. No. 10/454,889, filed Jun. 5, 2003, Saint-Jalmes.
U.S. Appl. No. 10/477,705, filed Nov. 14, 2003, Saint-Jalmes.
U.S. Appl. No. 10/481,646, filed Dec. 22, 2003, Rezag et al.
U.S. Appl. No. 10/485,735, filed Feb. 4, 2004, Saint-Jalmes.

* cited by examiner

PROCESS FOR MODULING THE INTERIOR SPACE OF A VEHICLE AND A SEAT FOR PERFORMING THIS PROCESS

This invention relates to a process for adjusting the interior space of a vehicle, as well as a seat for the implementation of such a process.

This invention is most particularly intended for public transportation vehicles (airplanes, trains, buses, . . . ) but it also can be applied to automotive vehicles, of the minivan type for example.

In public transportation vehicles, the seats more often than not are arranged once and for all in a given configuration. The seats possibly offer "degrees of freedom" making it possible, for example, for the back to be tilted or even sometimes to convert the seat into a berth. On the other hand, in public transportation vehicles, the orientation of the seats generally is fixed. In an airliner, more often than not all the seats are oriented facing forward, so that the passengers travel in the direction of movement of the airplane. In a train, there are seats arranged facing each other, groups of seats making it possible to travel in the running direction of the train and groups of seats making it possible to travel in the direction opposite to the running of the train.

In certain vehicles there are pivoting seats assembled on runners making it possible to adjust the interior space of a vehicle. Such seats are found, for example, in certain automotive vehicles of the minivan type. This type of seat also exists in special aircraft cabin or train layouts for private uses.

The drawback of the known solutions making it possible to adjust the interior space of a vehicle is that it is necessary to provide space around the adjustable seat, in particular in order to be able to make it pivot. Thus there is a significant loss of space. This is not compatible with the economic constraints existing in public transportation. In fact, for obvious reasons of profitability, it always is sought to have the greatest number of travelers travel in a given space.

This invention then has the purpose of making an interior space of a vehicle adjustable without changing the capacity of this space in terms of number of seats. The change in configuration of this space preferably should be able to be implemented rapidly. In the case of an aircraft, it also will be preferable that the proposed solution does not entail any appreciable extra load.

To this end, it proposes a process for adjusting the interior space of a vehicle comprising seats each having a sitting portion and a back.

According to the invention, this process consists, for at least one seat, in moving the back of the said seat from a first position in which a lower edge of the back is facing a first transverse edge of the sitting portion, to a second position in which the said lower edge of the back is facing the transverse edge opposite the said first transverse edge.

In this manner, it is possible to change the orientation of a seat. When the back of the seat is in its first position, a passenger seated in this seat travels, for example, in the running direction of the vehicle which he occupies. By moving the back, the passenger, still in the same seat, then travels in the direction counter to the running of the said vehicle. It thus is possible to position seats face to face upon request and thus to adjust the interior space of the vehicle. In proceeding as taught by this invention, there is no need to make the seat pivot or to dismantle it to change its orientation in the vehicle. A simple movement of the back suffices. This movement can be accomplished very well without encroaching upon the space corresponding to a neighboring seat.

The movement of the back described above advantageously is combined with a rotation of approximately 180° around an axis. Thus, irrespective of the position of the back, it always is the same surface of the back that serves as support for the back of a passenger. Provision thus can be made on one surface of the back for the presence of a shelf. The other surface of the back can be formed as a back usually is, to adapt to the morphology of the passengers.

The axis of rotation is, for example, an axis more or less perpendicular to the sitting portion. Nonetheless, provision of an axis parallel to this sitting portion can be considered.

For holding the back in these use positions, a locking of the back in relation to its sitting portion advantageously is provided when it is along an edge of the sitting portion.

This invention also proposes a seat intended for a vehicle, this seat comprising a sitting portion and a movable back. According to the invention, this seat comprises guiding means, referred to as first guiding means, for the movement of the back from one edge of the sitting portion to an opposite edge thereof. Such a seat makes possible the implementation of a process such as described hereinabove.

In a preferred embodiment, such a seat preferably also comprises second guiding means for the rotational guiding of the back over approximately 180°. As indicated above, it always is the same surface of the back that serves as support for the back of a passenger. The opposite surface then can be equipped with accessories, such as a shelf, for example. In this embodiment, the rotational guiding means comprise an axis of rotation corresponding more or less to an axis of symmetry of the back. This axis of rotation is, for example, more or less perpendicular to the sitting portion of the seat.

One embodiment of a seat such as defined hereinabove provides that the back is assembled on the sitting portion by means of a movable whole comprising on the one hand a base capable of moving between one edge of the sitting portion and an opposite edge, and on the other hand a support assembled pivoting on the base. In this embodiment, the first guiding means provide, for example, guiding of the base in relation to the sitting portion and the second guiding means provide, for example, rotational guiding of the support in relation to the base. Here, the first guiding means can comprise a groove parallel to the movement of the back, implemented in the sitting portion of the seat and into which a suitably shaped portion of the base penetrates.

When the seat comprises a movable base and a support, the movable base is, for example, in the form of a stirrup the base of which extends from one lateral edge of the sitting portion to the other and each branch of which extends more or less parallel to a lateral edge and is curved at its free end under the sitting portion.

In order to make possible the movement of the movable base, the latter comprises, for example, on both sides of the sitting portion, a handle making it possible to move it. In another embodiment, in order to move the movable base, the first guiding means comprise a lever on each side of the sitting portion; each lever is guided at each of its ends in a runner and the movable base is joined to the lever.

This invention also relates to a group of seats, characterized in that it comprises at least one seat such as described hereinabove.

It likewise relates to a vehicle intended for the transport of passengers, comprising at least one such seat. This vehicle can be, in particular, an aircraft.

Details and advantages of this invention will emerge more clearly from the description which follows, presented with reference to the attached schematic drawing in which.

The Figures in the drawing depict a seat such as is usually found in an aircraft. Nonetheless, the invention may be applied to all types of vehicles and can just as easily relate to a train or a bus.

In standard manner, the seats depicted in the drawing comprise a frame 2, a sitting portion 4, a back 6 topped by a headrest 8, as well as two armrests 10.

The frame 2 makes possible the fastening of the seat to a floor 12. In an aircraft, this floor incorporates in standard manner longitudinal rails anchored to the structure of the aircraft and having attachment points distributed along each rail with a predetermined distance.

In the embodiments depicted in the drawing, the sitting portion 4 is a sitting portion which is fixed in relation to the frame 2. This sitting portion comprises two longitudinal edges 14 and two transverse edges 16.

In this description, the orientations are defined in relation to a passenger seated in the seat. Thus, the longitudinal edges 14 correspond to the edges located to the right and left of a passenger seated in the seat, while the transverse edges 16 are the edges connecting these two longitudinal edges 14.

Whereas the sitting portion 4 generally is in a more or less horizontal plane, as regards the back 6, it generally is more or less vertical. Its shape is adapted to the human morphology and it therefore is slightly curved. This back has a general rectangular form. It thus has a lower edge 18, an upper edge 20 and two lateral uprights 22. In use position, the lower edge 18 of the back 6 is facing a transverse edge 16 of the sitting portion 4, while being more or less removed from this transverse edge 16. The sitting portion 4 and the back 6 thus form more or less a dihedron.

In standard manner, the headrest 8 is fastened at the upper edge 20 of the back 6, while the armrests 10 each are fastened to a lateral upright 22 of the back 6.

In original manner, the back 6 of a seat according to the invention can be placed at the transverse edge 16 of the seat or the opposite transverse edge 16. FIGS. 1 to 4 depict the various stages making it possible to change the back 6 from one transverse edge 16 to the other. FIGS. 5*a* to 5*h* show this same movement of the back in a view from above. It is considered that the views of FIG. 5 depict the same seat as FIGS. 1 to 4.

Figure 5A:
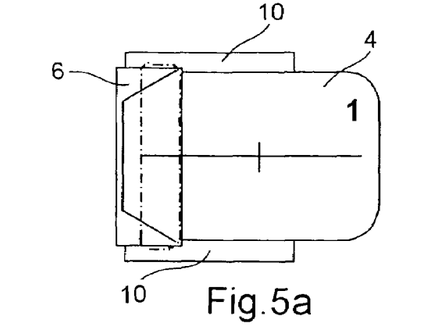
FIGS. 5*a* to 5*h* depict the seat of FIGS. 1 to 4 in a view from above in eight distinct positions.
Figure 5B:
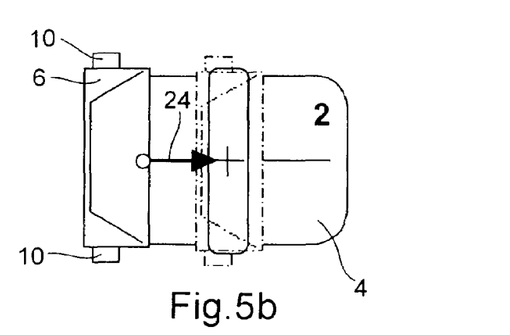
Figure 5C:
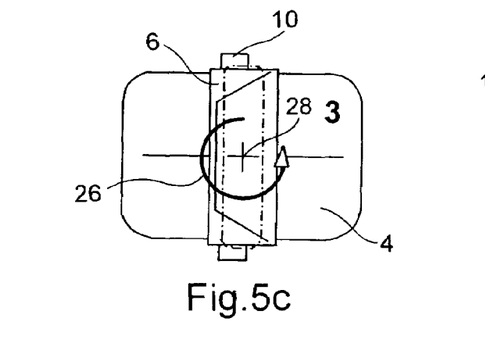

In FIG. 5*a*, the depicted seat is in a normal use position. The back 6 is facing a transverse edge 16 of the sitting portion 4 and the armrests 10 are turned down in a more or less horizontal position. These armrests 10 initially are turned up. This movement is suggested in FIG. 1, one position of the armrests 10 being represented in an unbroken line and two other positions thereof being drawn in combination lines. The position with the armrests 10 turned up corresponds to FIGS. 1 and 5*b*. In the latter Figure, an arrow 24 suggests the movement of the back 6 toward a central position represented in combination lines.

Figure 1:
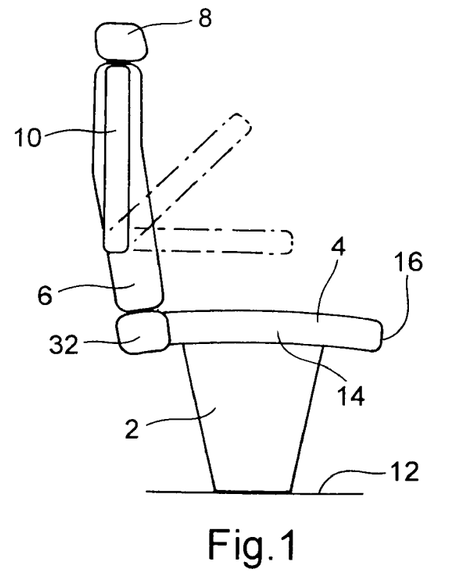
FIGS. 1 to 4 show in side view a seat according to the invention in four distinct positions.
Figure 2:
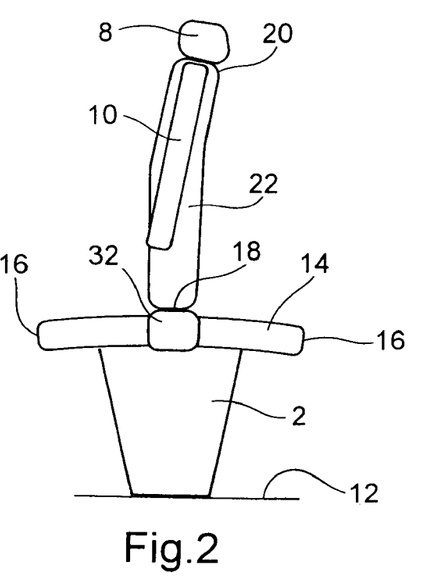
Figure 3:
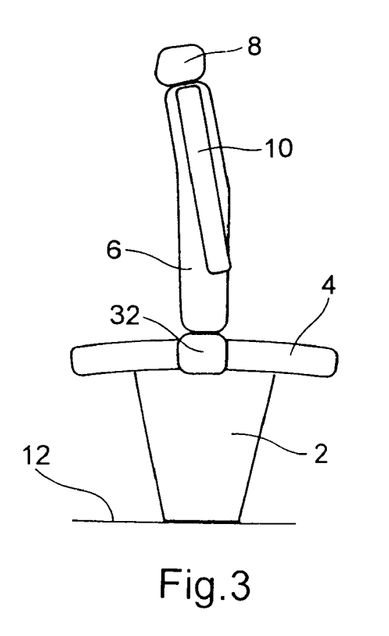
Figure 4:
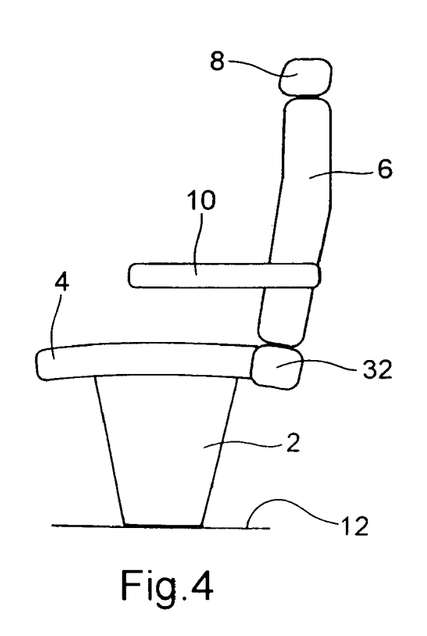
Figure 5D:
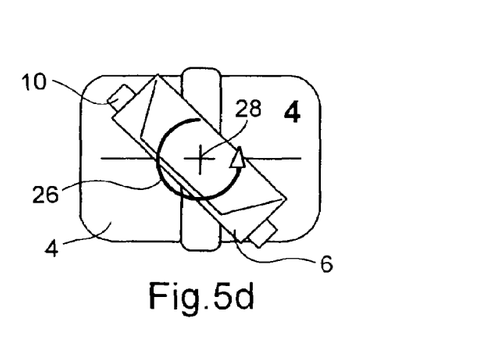
Figure 5E:
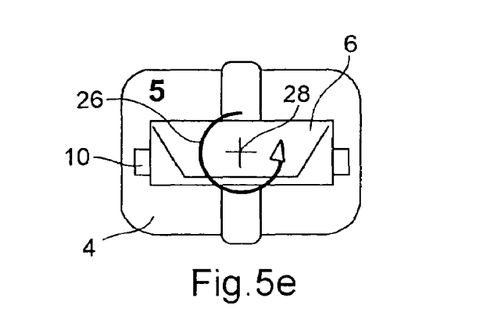
Figure 5F:
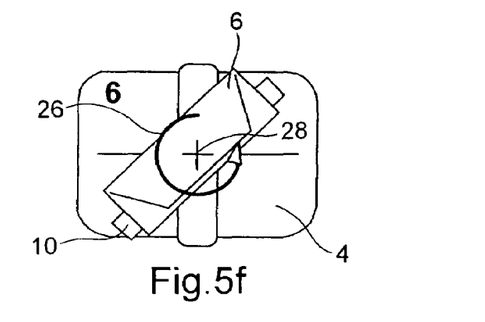
Figure 5G:
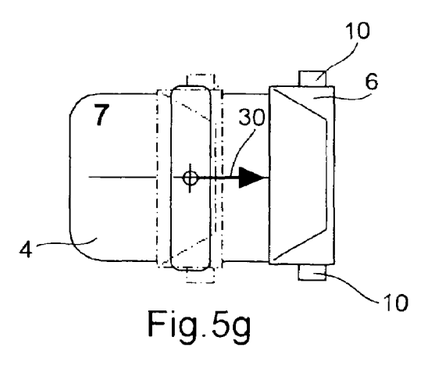
Figure 5H:
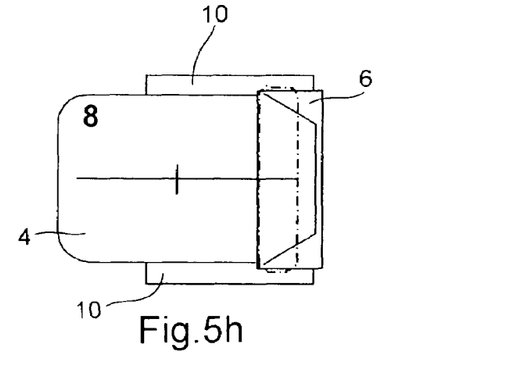

Once it has reached this central position (FIGS. 2 and 5*c*), the back 6 begins to pivot as suggested by the arrow 26. FIGS. 5*d* to 5*f* show intermediate positions of the back 6 in the process of its pivoting. In all, the back 6 turns 180° around a median vertical axis 28. After this rotation, the back is in the position depicted in FIG. 3. The back 6 then is pushed toward the second transverse edge 16 of the seat as suggested by the arrow 30 of FIG. 5*g*. The armrests 10 then are turned down from their more or less vertical position to a more or less horizontal position as depicted in FIGS. 4 and 5*h*. The same seat then is seen with a different orientation. Thus, a passenger traveling in the operating direction of the aircraft in the seat of FIG. 5*a* is traveling in the direction counter to operation when he is seated in the same seat in its configuration depicted in FIG. 5*h*.

The act of moving the back 6 as described hereinabove and illustrated in FIGS. 1 to 5 makes it possible to obtain a great adjustability in the layout of an aircraft cabin or in any compartment intended to accommodate passengers. In such a space intended to accommodate passengers, seats which face one another thus can be created upon request. If two passengers are traveling together, they thus can choose to travel either face to face or side by side. It becomes equally easy for four passengers traveling together to have four face-to-face seats. All kinds of combinations can be contemplated. Provision can be made, for example, to alternate the orientation of the seats from one row to the other. The combinations are many in number. For a group of n seats, there are a priori $2^n$ possible combinations.

This great adjustability is achieved while being able to keep the seats side by side. It is not necessary to provide spacing between two neighboring seats to allow the pivoting thereof. The proposed solution therefore is economical in terms of space. In fact, a large number of seats can be placed in a given space with significant adjustability.

In an aircraft of the prior art, in order to obtain the same adjustability in a given space and with the same capacity in terms of passengers, it was necessary to plan on dismantling each seat individually and turning it around before reattaching it to the floor of the cabin. Such an operation can be considered in very exceptional cases, but it is very time-consuming. As regards the solution according to the invention, for example, in an aircraft, consideration can be given to offering, for example, to business-class passengers, the choice of a special configuration for passengers traveling together. For each flight, the interior space of the cabin thus can be adjusted on request.

FIGS. 6 to 9 show technical means making it possible to move the back on a seat as explained with the aid of FIGS. 1 to 5.

Figure 6:
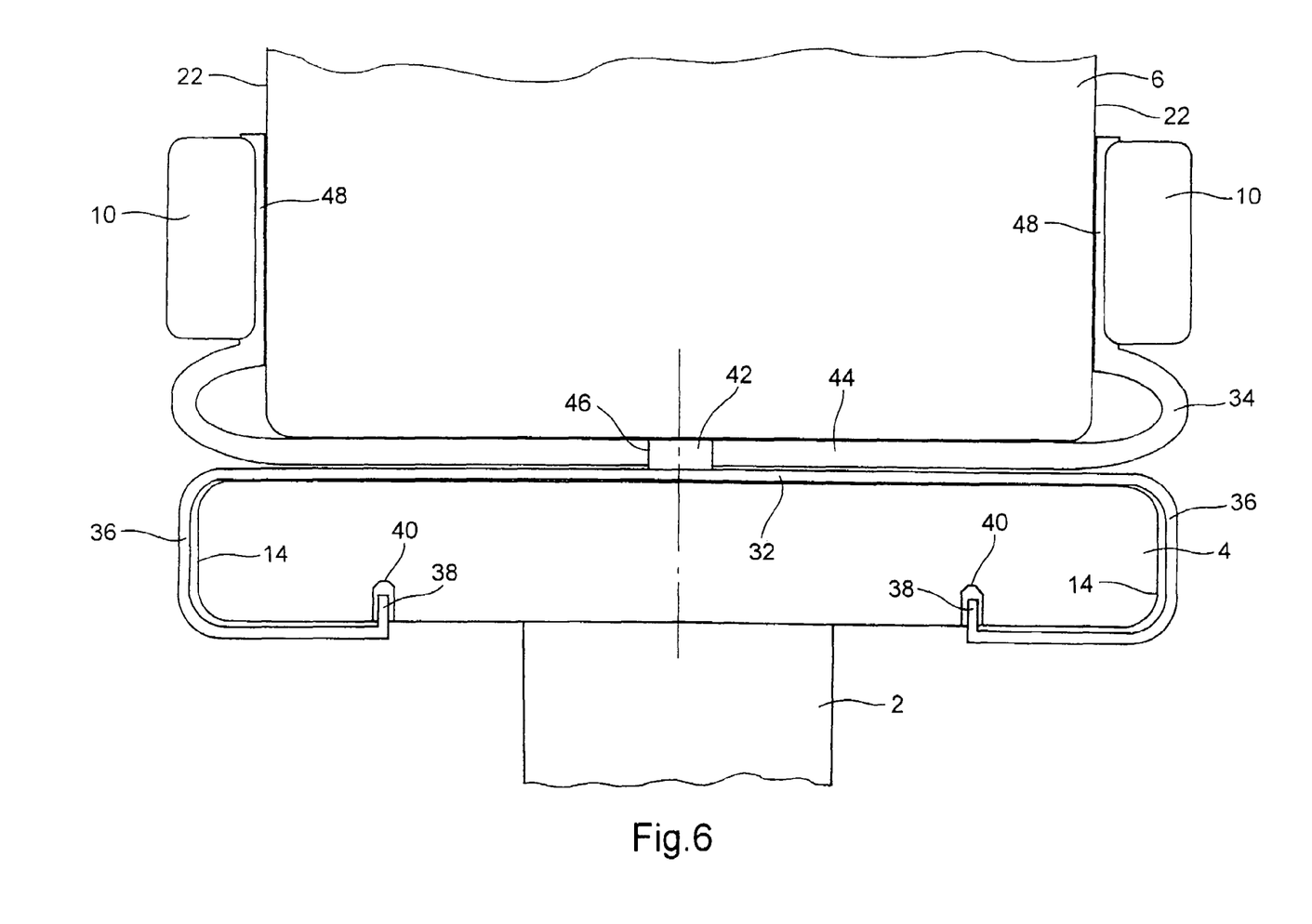
FIG. 6 is a front view, on enlarged scale, of a first embodiment of a mechanism making it possible to move the back of a seat according to the invention.

FIG. 6 shows a preferential embodiment of a device making possible the movement of a back such as depicted in FIGS. 1 to 5. The frame 2, the sitting portion 4, a portion of the back 6, as well as the two armrests 10 can be recognized in this FIG. 6. The back 6 is joined to the sitting portion 4 by means of a movable whole comprising on the one hand a movable base 32 and on the other hand a support 34.

The movable base 32 is, for example, in the form of a metal band arranged transversely in relation to the sitting portion 4 and folded back at its ends. This movable base 32 then has in a front view (cf. FIG. 6) the form of a stirrup. The base of this stirrup comes to rest on the upper surface of the sitting portion 4, that is, the surface intended to accommodate a passenger. The branches 36 are curved downward and extend parallel to the longitudinal edges 14 of the sitting portion 4. The free ends of the branches 36 are curved under the sitting portion 4 and each has a guiding return 38. Each of the guiding returns 38 is housed in a longitudinal groove 40 implemented in the lower surface of the sitting portion 4. The guiding returns 38 thus cooperate with the grooves 40 to guide the movable base 32 in a longitudinal translatory movement in relation to the sitting portion 4.

The support 34 is assembled pivoting on the movable base 32. To this end, the movable base 32 bears at its center a journal 42 projecting toward the back 6. The support 34 is U-shaped. Its base 44 rests on the base of the stirrup forming the movable base 32. It has at its center a bore 46 cooperating with the journal 42.

The back 6 is fixed between the branches 48 of the support 34. The lateral posts 22 of the back 6 thus come to rest on the inner surface of the branches 48 of the support 34. These branches 48 bear, for example, the armrests 10.

Figure 7:
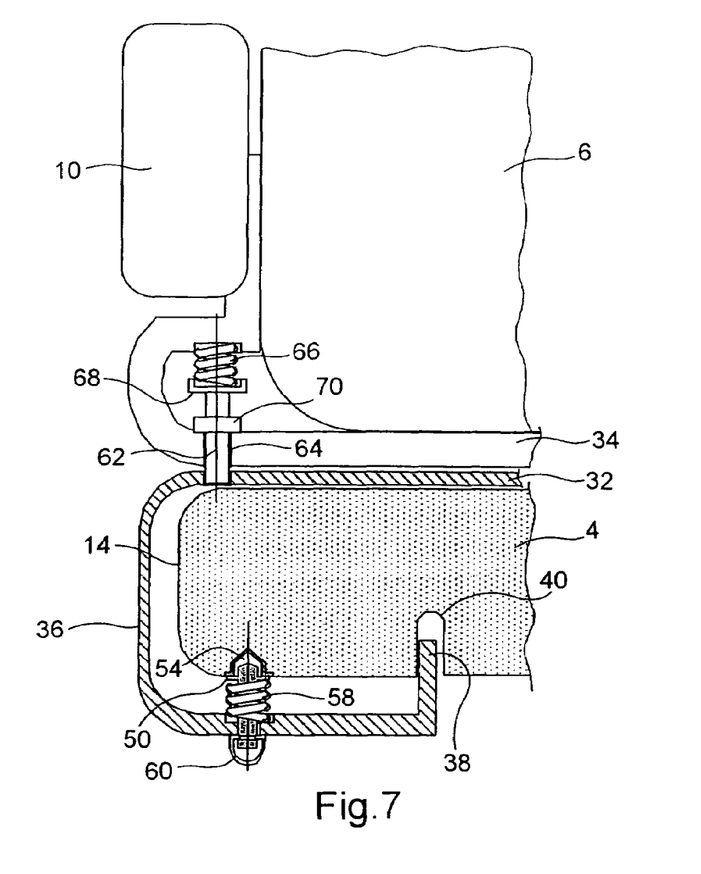
FIG. 7 is a detail view depicting the locking means for a seat of the type partially depicted in FIG. 6.
Figure 8:
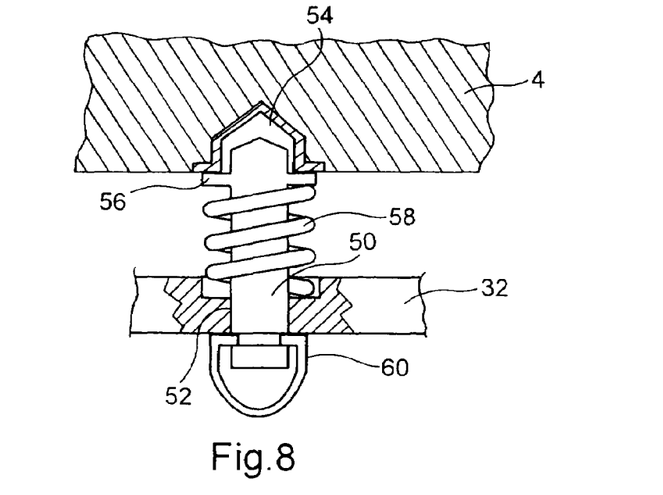
FIG. 8 is a detail view showing a lock depicted in FIG. 7.

FIGS. 7 and 8 depict locking means making it possible on the one hand to lock the movable base in relation to the sitting portion 4 and on the other hand the support 34 and the back 8 in relation to the movable base 32.

FIG. 8 depicts a lock 50 for clamping of the movable base 32 in relation to the sitting portion 4. This lock 50 is of general cylindrical shape. It is assembled on the movable base 32 under sitting portion 4 as can be seen in FIG. 7. This lock 50 is assembled sliding in a bore 52 implemented in the movable base 32. The end of the lock 50 positioned on the sitting portion 4 side is placed in a housing 54 provided for this purpose. On the housing 54 side, the lock 50 has a flange 56. The latter serves as a stop to limit the movement of the end of the lock 50 inside the housing 54 of the sitting portion 4. It also serves, on its surface opposite the one serving as a stop, as a support for a spring 58. The latter also rests on the movable base 32. A shoulder advantageously is implemented on this movable base 32 to accommodate the end of the spring 58, as can be seen in FIG. 8. The spring 58 thus restrains the lock 50 in its locked position. To release the movable base 32, it suffices to pull on the lock 50 against the restraint exercised by the spring 58. An operating ring 60 is provided for this purpose.

The locking of the support 34 on the movable base 32 is implemented in a somewhat similar manner. A cylindrical lock 62 is assembled sliding in a bore 64 of the support 34. This lock 62 cooperates with a hole implemented in the movable base 32 and intended to accommodate one end of the lock 62. A spring 66 restrains the lock 62 in locked position. The spring 66 comes to rest on the one hand on the end of the lock 62 opposite the end intended to cooperate with the movable base 32 and on the other hand on a surface provided for this purpose on the support 34. The support 34 depicted in the drawing (FIGS. 6 and 7) comprises at the base of each branch 48 a cavity oriented toward the inside of the U formed by the support 34. The system for locking of the support 34 on the movable base 32 is arranged inside this cavity. In order to release this lock 62, it suffices to act against the spring 66. A shoulder 68 is provided to facilitate the action on the lock 62. As depicted in the drawing, to limit the movement of the lock 62 in a locking direction, a flange 70 can be provided to come to rest on the support 34 around the bore 64.

A single lock 50 or a single lock 62 can be provided. To ensure a better locking, however, a second lock 50 and/or 62 preferably is provided symmetrically. For each lock 50, the sitting portion 4 comprises two housings 54 intended to accommodate the end of the corresponding lock 50, each of these housings 54 being close to the transverse edge 16.

For the lock 62, if a single lock is provided, it will be necessary to provide two holes in the movable base 32 in order to be able to ensure locking of the back 6 and of its support 34 in two distinct positions. On the other hand, if two locks 62 are provided, arranging them symmetrically, only two holes will be necessary in the movable base 32 to accommodate the ends of these locks 62, the pivoting of the support 34 in relation to the movable base 32 being 180°.

Once the movable base 32 is released in relation to the sitting portion 4, handles can be provided to move this movable base 32 in relation to the sitting portion 4. These handles can be formed by the branches 36 of the movable base 32 when the latter have the form of a stirrup described above. In order to facilitate the operation for movement of the movable base 32, it advantageously is provided that the branches 36 are set at a slight distance from the longitudinal edges 14 of the sitting portion 4.

Figure 9:
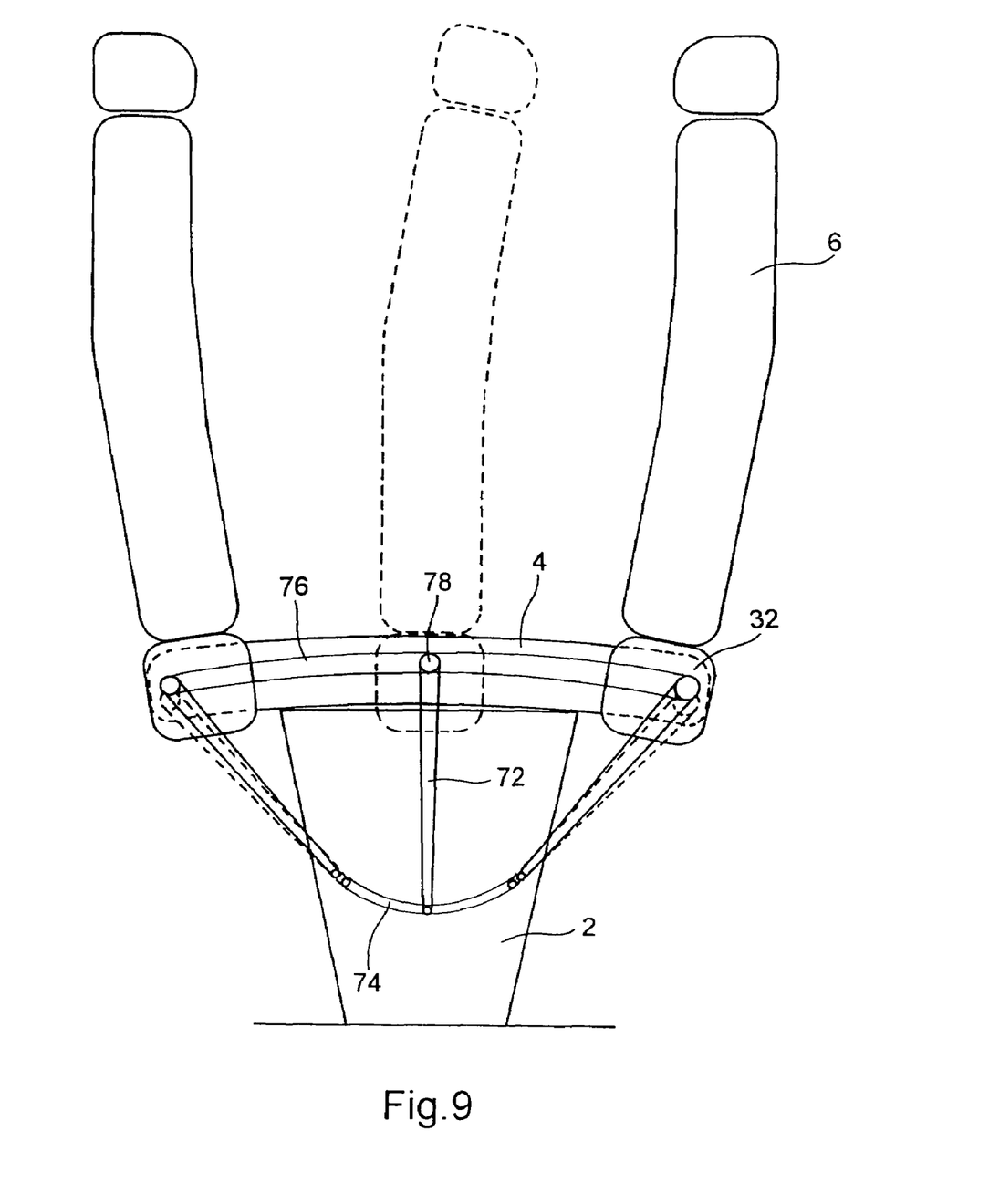
FIG. 9 is a side view of a second embodiment of a seat according to the invention.

FIG. 9 depicts a variant embodiment of a seat according to the invention. There are seen again the same seat structure and similar means for movement of the back 6 in relation to the sitting portion 4, that is, comprising a base 32 capable of moving between a transverse edge 16 of the sitting portion 4 and the opposite transverse edge 16, as well as a support 34 bearing the back 6 assembled pivoting on the movable base 32. The differences in implementation lie in the guiding of the movable base 32 in relation to the sitting portion 4, as well as in the locking of this movable base in relation to this sitting portion.

In this embodiment, a lever 72 connects the frame 2 to the base 32 and the sitting portion 4. Each lever 72 is guided at its lower end in a guiding groove 74 implemented, for example, in a lateral surface of the frame 2. This groove 74 also can be added on the frame 2.

As regards the upper end of each lever 72, it is guided in a groove 76 implemented in a longitudinal edge 14 of the sitting portion 4. There can be provided, for example, at the upper end of each lever 72, the assembly of a pin 78 traversing the branch 36 corresponding to the movable base 32 and engaging in the groove 74. In this manner, when the levers 72 are operated, the movable base 32 is carried along and guided in relation to the groove 74.

In this embodiment, in order to implement the locking, a downward recess is provided at each end of the groove 74. Once the lever 72 abuts at the bottom of one end of the groove 74, it suffices to place the end of the pin 78 in the recess provided for this purpose in order to lock the lever 72 and therefore also the movable base 32 in its position.

These two embodiments of a seat make it possible to achieve the adjustability described above in an interior space of a vehicle intended to accommodate passengers. In comparison with a "standard" seat, the additional cost of a seat according to the invention is minimized. Furthermore, the mass of the seat remains more or less unchanged. For this reason, such seats according to the invention also can find application in an aircraft.

This invention is not limited to the embodiments described above by way of nonrestrictive examples. It also relates to the variant embodiments within the reach of the individual skilled in the trade within the context of the claims hereinbelow.

Thus, for example, other mechanisms could be provided to ensure the movement of the back in relation to the sitting portion. Two runners on each side of the sitting portion or else even one central runner could be provided. As regards the back, the 180° pivoting possibly is optional—in fact, if the back is designed as being a reversible back existing, for example, in the form of a "biconcave" back.

In the examples described, the backs are pivoting in relation to an axis more or less perpendicular to the plane of the sitting portion. Having the back pivot in relation to a more or less horizontal (and therefore more or less parallel to the sitting portion) axis also may be contemplated. A median horizontal axis, for example, then is chosen. This makes it possible also to provide for a tilting of the back. In this manner, provision can be made to have the back pivot either a few degrees around its axis of pivoting, or approximately 180°. When there is pivoting of the back, this pivoting can be implemented when the back is more or less in the center of the sitting portion, as described above, but also in any other relative position of the back in relation to the sitting portion.

The invention claimed is:

1. A seat for a vehicle, comprising:
   a sitting portion;
   a movable back; and
   a first guide mechanism configured to move the back from a first edge of the sitting portion to an opposite second edge of the sitting portion,
   wherein the back is assembled on the sitting portion by a movable element comprising a base configured to move between the first edge of the sitting portion and the opposite second edge, and a support assembled pivoting on the movable base, and
   wherein the movable base is in a form of a stirrup, a base of the stirrup extending from a first lateral edge to a second latent edge of the sitting portion, and wherein each branch of the stirrup extends substantially parallel to the first lateral edge and is curved at a free end under the sitting portion.

2. A seat according to claim 1, wherein the first guide mechanism is configured to guide the movable base in relation to the sitting portion and a second guide mechanism is configured to guide in rotation the support in relation to the movable base.

3. A seat according to claim 2, wherein the first guide mechanism comprises a groove parallel to said longitudinal translatory movement of the back, implemented in the sitting portion of the seat and into which a suitably shaped portion of the movable base penetrates.

4. A seat according to claim 2, wherein said second guide mechanism is configured to guide the back through a rotation over a central position of said sitting portion, said central position being equidistant from said first edge of the sitting portion and said opposite second edge of the sitting portion.

5. A seat according to claim 1, wherein the movable base comprises on both sides of the sitting portion a handle configured to allow movement of the movable base.

6. A seat according to claim 1, wherein the first guide mechanism comprises a lever on each side of the sitting portion, wherein each lever is guided at each of its ends in a runner, and wherein the movable base is connected to the lever.

7. A group of seats comprising at least one seat according to claim 1.

8. A vehicle for transport of passengers, comprising at least one seat according to claim 1.

9. A vehicle according to claim 8, wherein the vehicle is an aircraft.

* * * * *